(12) United States Patent
Glossner, III et al.

(10) Patent No.: US 7,308,559 B2
(45) Date of Patent: Dec. 11, 2007

(54) DIGITAL SIGNAL PROCESSOR WITH CASCADED SIMD ORGANIZATION

(75) Inventors: Clair John Glossner, III, Carmel, NY (US); Erdem Hokenek, Yorktown Heights, NY (US); David Meltzer, Wappingers Falls, NY (US); Mayan Moudgill, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/456,793

(22) Filed: Jun. 7, 2003
(Under 37 CFR 1.47)

(65) Prior Publication Data

US 2004/0078554 A1    Apr. 22, 2004

Related U.S. Application Data

(63) Continuation-in-part of application No. 09/514,497, filed on Feb. 29, 2000, now Pat. No. 6,665,790.

(60) Provisional application No. 60/391,778, filed on Jun. 26, 2002.

(51) Int. Cl.
*G06F 15/80* (2006.01)
(52) U.S. Cl. .......................................... 712/23; 712/22
(58) Field of Classification Search ..................... 712/9, 712/23, 22, 4
See application file for complete search history.

(56) References Cited

U.S. PATENT DOCUMENTS

| | | | | |
|---|---|---|---|---|
| 4,710,867 A | | 12/1987 | Watanabe ....................... 712/8 |
| 4,745,547 A | * | 5/1988 | Buchholz et al. ............... 712/4 |
| 4,827,407 A | | 5/1989 | Nakatani ......................... 712/6 |
| 4,870,569 A | * | 9/1989 | Nakatani et al. ............. 711/151 |
| 5,200,915 A | * | 4/1993 | Hayami et al. ............. 708/520 |
| 5,537,606 A | * | 7/1996 | Byrne ........................... 712/7 |
| 5,560,035 A | | 9/1996 | Garg et al. ................. 395/800 |
| 5,669,013 A | | 9/1997 | Watanabe et al. ........... 711/100 |
| 5,689,677 A | * | 11/1997 | MacMillan ................. 711/106 |
| 5,838,984 A | * | 11/1998 | Nguyen et al. ................ 712/5 |
| 6,044,448 A | * | 3/2000 | Agrawal et al. ............... 712/9 |

(Continued)

OTHER PUBLICATIONS

Prasad et al. . "Half-Rate GSM Vocoder Implementation On A Dual Mac Digital Signal Processor", 1997 IEEE pp. 619-622.

(Continued)

*Primary Examiner*—Eric Coleman
(74) *Attorney, Agent, or Firm*—F. Chau & Associates, LLC (57) ABSTRACT

A digital signal processor (DSP) includes dual SIMD units that are connected in cascade, and wherein results of a first SIMD stage of the cascade may be stored in a register file of a second SIMD stage in the cascade. Each SIMD stage contains its own resources for storing operands and intermediate results (e.g., its own register file), as well as for decoding the operations that may be executed in that stage. Within each stage, hardware resources are organized to operate in SIMD manner, so that independent SIMD operations can be executed simultaneously, one in each stage of the cascade. Intermediate operands and results flowing through the cascade are stored at the register files of the stages, and may be accessed from those register files. Data may also be brought from memory directly into the register files of the stages in the cascade.

39 Claims, 9 Drawing Sheets

U.S. PATENT DOCUMENTS 6,049,859 A * 4/2000 Gliese et al. .................. 712/17
6,052,766 A * 4/2000 Betker et al. ................ 711/200
6,266,758 B1 7/2001 van Hook et al. ............... 712/2
6,272,616 B1 * 8/2001 Fernando et al. ............. 712/20
6,288,723 B1 9/2001 Huff et al. ................... 345/433
6,308,252 B1 10/2001 Agarwal et al. .............. 712/22

OTHER PUBLICATIONS

Yarlagadda, "Lextra Adds DSP Extensions", Microdesign Resources, Aug. 23, 1999. Microprocessor Report.

* cited by examiner

DIGITAL SIGNAL PROCESSOR WITH CASCADED SIMD ORGANIZATION

CROSS REFERENCE TO RELATED APPLICATIONS

This application is a continuation-in-part of U.S. patent application Ser. No. 09/514,497 filed Feb. 29, 2000 now U.S. Pat. No. 6,665,790, the disclosure therein in its entirety is incorporated-by-reference herein. This application claims priority benefits to Provisional Application Ser. No. 60/391,778 on Jun. 26, 2002.

BACKGROUND OF THE INVENTION

1. Field of the Invention

The present invention relates generally to digital signal processing systems and, more particularly, to an improved digital signal processor architecture.

2. Background of the Invention

Digital signal processing is characterized by operating on sets of data elements which are continuously evolving in time. These data sets correspond to the digital representation of signals in the analog domain, and are referred to as vectors. Digital signal processing algorithms are characterized by frequently performing the same computation on each of the elements in a vector. For example, a filtering algorithm may multiply each element in a vector by a different factor, and accumulate the partial results into a single final result.

Elementary signal processing algorithms, known as signal processing kernels, are characterized by the execution of sequences of operations on the vector elements. As stated above, one example is the execution of multiplication followed by the execution of accumulation. In regard to the execution of such sequence of operations, the state of the art in the implementation of digital signal processors includes either performing a sequence of operations using the same arithmetic/logic unit for as many times as the number of operations in the sequence (e.g., a multiplication operation in one cycle followed by an accumulation operation in the next cycle), or structuring the hardware as a pipeline in which operands enter at one end, with the operations being performed as the data flows through the pipeline, and results obtained at the other end of the pipeline (e.g., a multiply-add pipeline).

A significant limitation in the state of the art, in particular the pipeline approach mentioned above, is the restricted flexibility for performing the operations that compose the signal processing kernels, due to the conventional pipeline organization. The schemes in the state of the art do not allow for intermediate results to be collected for processing further down in the pipeline, perhaps in a different order in which the intermediate results are generated, or for changing the sequence of operations in the pipeline at some arbitrary points in time. These limitations require more complex sequences of instructions and usually require more execution cycles, thereby restricting the maximum performance that can be obtained from the functional units.

For the purposes of executing digital signal processing algorithms on a programmable processor, the vectors of data elements may be grouped into smaller subsets, for example, of four elements per subset, and computations can be performed simultaneously (in parallel) on all the elements of the subset. Two alternative schemes are currently used for grouping the data elements and specifying such operation.

In the first approach, the data elements in one subset of a vector are located in separate registers, and a different instruction specifies the operation performed on each of the elements. Although multiple instructions are used to specify the operations performed simultaneously on the data elements, all these instructions correspond to a single program flow, and thus are treated as a single entity. This approach is known as Very-Long Instruction Word (VLIW), referring to the case wherein a single very long instruction word contains a plurality of basic instructions. In the case of computations for a subset of a vector, all the basic instructions are identical because the same operation is performed on all the data elements; the only difference among these basic instructions is the location of operands and results. This approach is used in various digital signal processors, such as the C64 from Texas Instruments Inc., SC140 from StarCore, and ADSP 2116x from Analog Devices, Inc.

In the second approach, all the data elements in one subset of a vector are located in the same register ("wide register"), and a single instruction specifies the operation performed on all such elements. This approach is known as Single Instruction, Multiple Data (SIMD) with subword paralellism. The term SIMD refers to the use of only one instruction for all the operations, whereas the term subword parallelism refers to the concatenation of multiple data elements in the same register. This approach is used in various multimedia and signal processing-oriented microprocessor extensions, such as MMX from Intel Corportaion and ALTIVEC from Motorola. Inc.

These approaches suffer from various limitations. In particular, the use of SIMD with subword parallelism requires placing the data elements in the right order within the wide registers, and further requires mechanisms to move the data elements around as needed. These requirements translate into additional hardware resources and execution cycles. On the other hand, the use of the VLIW approach requires coding multiple instructions that perform the same operation, thus leading to longer instructions (the so-called VLIWs), which tend to require more space in instruction memory.

SUMMARY OF THE INVENTION

The present invention is directed to an improved digital signal processor architecture.

In various embodiments of the present invention, a method for processing digital signal information employs a processor having a first datapath connected in cascade with a second datapath. This novel arrangement allows a first SIMD instruction to be executed in the first data path concurrently with a second SIMD instruction in the second datapath.

The first datapath and the second data path may each include its own register file. Furthermore, an instruction executed in the first datapath may cause vector information to be loaded into the register file of the first data path to be operated upon. Results of an operation performed in the first datapath are transferred to the register file of the second datapath. The results transferred to the register file of the second data path are operated upon in the second datapath. Furthermore, results transferred to the register file of the second datapath may be zero-extended or sign-extended to have a bit-length equal to the width of the second datapath. Results of an operation performed in the second datapath may be transferred back into the register file of the second datapath, to memory, or to the register file of the first datapath.

Data transferred to memory or to the register file of the first datapath may be size reduced. The size reduction operation may include saturation, rounding, truncation, bit extraction, or combinations thereof, for example.

Any combination of known or later developed register file structures may be used to implement the present invention. For example, a register file may be organized as a plurality of register banks, a wide register or as a register file with arbitrary addressing of its elements. This arbitrary addressing can be accomplished using a pointer register having a plurality of pointers, each of the pointers pointing to an element of a register file. If arbitrary addressing is used, operands of a SIMD instruction may be specified using the pointer register and/or the pointer register may be used to store result data.

Furthermore, dedicated hardware may be used to combine a plurality of values and to place a single result into a dedicated register.

The width of the first datapath may differ from the width of the second datapath. In various exemplary embodiments discussed herein, the width of the first datapath is 16 bits and the width of the second datapath is 40 bits. However, other widths (e.g. 24 and 50 bits, respectively) may be used depending on the application.

These and other aspects, features and advantages of the present invention will become apparent from the following detailed description of preferred embodiments, which is to be read in connection with the accompanying drawings.

BRIEF DESCRIPTION OF THE DRAWINGS

The invention will be described in detail in the following description of preferred embodiments with reference to the following figures wherein.

DETAILED DESCRIPTION OF PREFERRED EMBODIMENTS

The present invention provides a vector register file to include vector data, preferably for single instruction multiple data (SIMD) processing. The present invention also provides a register file for accessing an arbitrary subvector of the vectors included therein. The present invention will be described in terms of a processor circuit having components with a predetermined number of elements, address lines or components of a given size. These sizes of components or vectors, addresses, number of inputs, number of outputs, number of elements, etc. are illustrative only, and should not be construed as limiting the invention.

In one illustrative embodiment of the present invention, a vector register file is disclosed which is organized for holding one or more vectors of total size equal to or less than 512 elements where each access reads or writes 4 elements of 16 bits. Vectors are data structures composed of linear arrays of elements representing quantities. Addresses for access into the vector register file are specified by address pointers included in an integral but separately accessed pointer array. Each pointer specifies the address of one element of the four which can be read or written for each access cycle on each access port. The pointer file includes a multiplicity of pointers. The needed number of pointers, for example, four, for each access are selected by information included in the instruction controlling the SIMD processing program. The register file is therefore of the indirectly addressed type. After being used to determine the access address for the vector data array portion of the file, the contents of the pointer array portion may be updated (under instruction control), for example, with an incremented value (to allow sequential access of the vector), or the contents of the vector read (to allow table lookup access or data gathering accesses). Other embodiments of the present invention also provide updates for stride accesses, modulo (circular) access, or for other access methods. The programs of the present invention permit the calculation of address values and the loading of the updated values into the pointer address file for use.

It should be understood that the elements shown in FIGS. 1-5 may be implemented in various forms of hardware, software or combinations thereof. These elements may be implemented in software on one or more appropriately programmed general purpose digital computers or storage devices having a processor and memory and input/output interfaces. The present invention may also be implemented in hardware. When implemented in hardware, computations, including address updates, may be advantageously handled as pipelined operations at a full pipeline rate.

Figure 1:
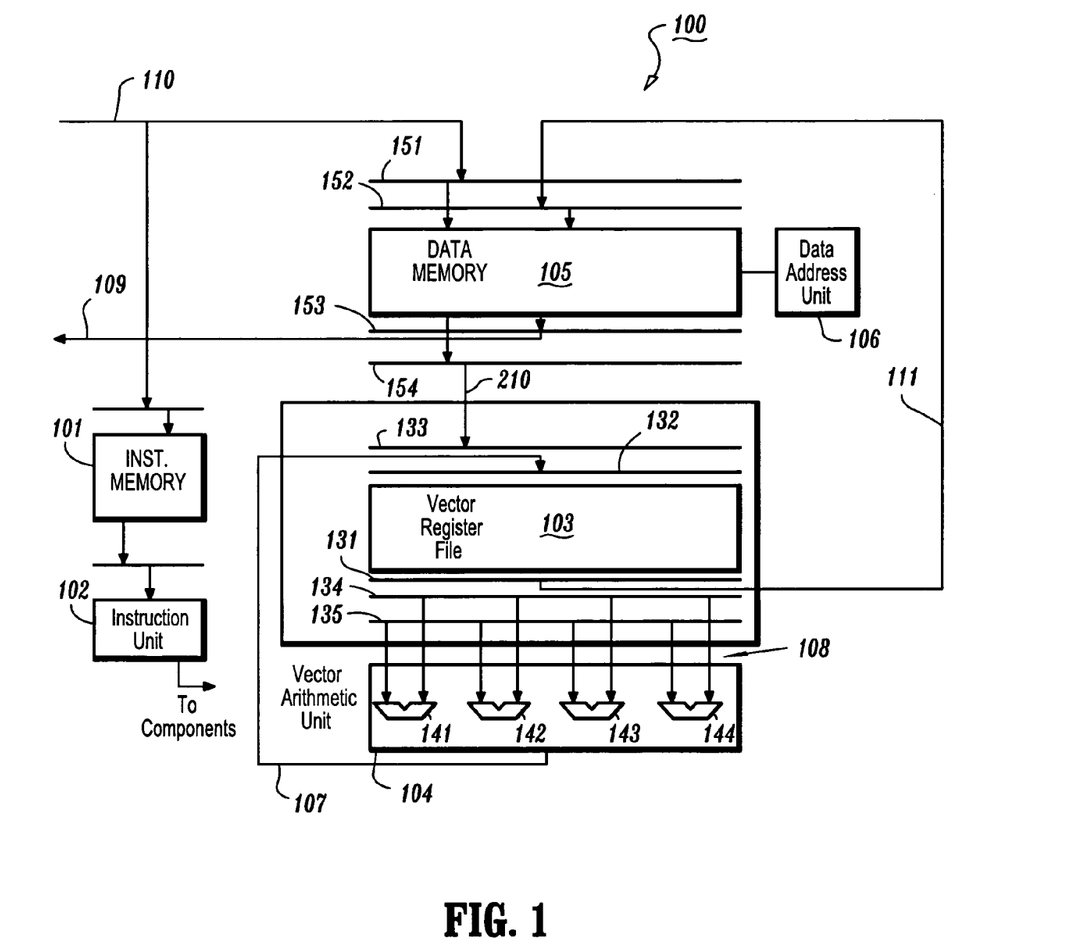
FIG. 1 is a schematic diagram showing a single instruction multiple data (SIMD) digital signal processor (DSP) or a media processor employing the present invention.

Referring now to the drawings in which like numerals represent the same or similar elements throughout the FIGS. and initially to FIG. 1, an illustrative processor 100 is shown. Processor 100 may include a media processor, SIMD processor or digital signal processor (DSP) which preferably includes an instruction memory 101 which provides instructions to an instruction unit 102. Instruction unit 102 sequences a program stored, for example, in instruction memory 101, and provides decoded controls to other elements or components of processor 100. Data to be processed are held in a multiported data memory 105 having, for example, two read data ports 153 and 154, and two write data ports 151 and 152, each of which is accessed with addresses provided by a data address unit 106. Data are moved from memory 105 via read port 154 to write port 133 of a vector register file 103 for use by vector register file 103 via write port 132 for use by vector arithmetic unit 104. Results of the computations are stored in vector register file 103 via write port 132. The file stored in vector register file 103 may be used for further computations or moved to data memory 105 via read port 131 to bus 111 and write port 152. Programs and input data for processor 100 are provided from external memory or I/O devices over input 110 and results are sent to external memory or I/O via an output bus 109.

Each of arithmetic units 141-144 operates on one element of each of two subvectors read from register file 103 via read ports 134 and 135, each arithmetic unit 141-144 may perform an identical function with the others. A four element subvector of results is produced which is then written back to the register file 103 via write port 132. The computation performed in unit 104 can proceed faster if a desired subvector is more easily selected over each of the ports 132, 134, 135.

Figure 2:
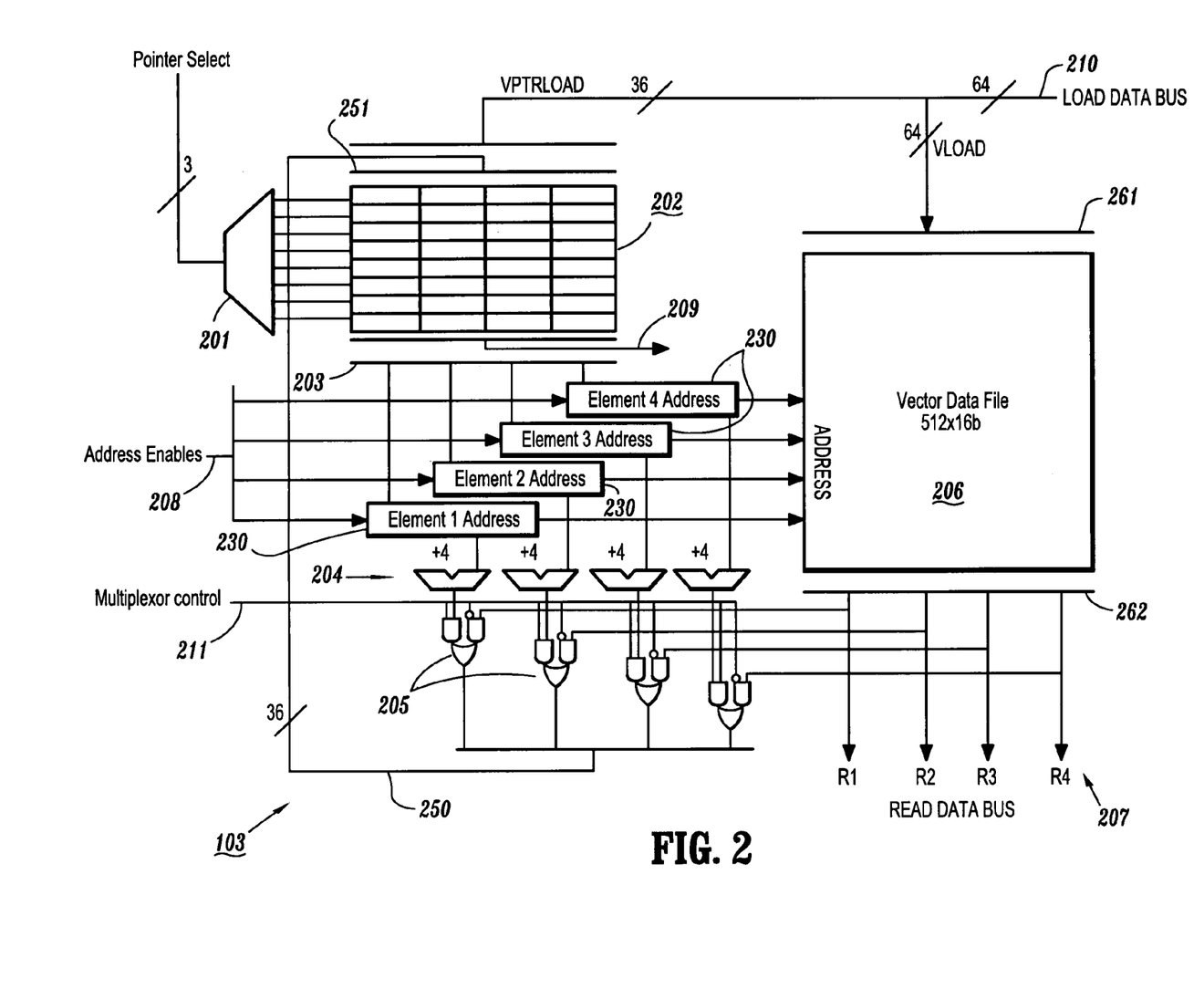
FIG. 2 is a schematic diagram showing one embodiment of a vector data file for vectors of 16 bit elements which includes an 8 entry pointer address file, 512 entry vector data file, and access for one arbitrary subvector of 4 elements in accordance with the present invention.

Referring to FIG. 2, vector register file 103 (FIG. 1) is now described in greater detail. Vector register file 103 includes logic for one of the access ports 131-135 (FIG. 1). It is noted that for simplicity data bus 207 in FIG. 2 represents one of two data busses shown as 108 in FIG. 1. Also, input port 210 is one of the two input ports 131 or 132 shown in FIG. 1. A vector address pointer array 202 is illustratively composed of, for example, eight words, each of which is composed of four fields of nine bits. Vector address pointer array 202 is addressed by a three bit address (Pointer Select) generated by instruction unit 102 of the processor 100 (FIG. 1) which selects one word of eight by a word decoder 201. The vector data are included in a vector data file 206 which, in one embodiment, includes 512 elements of 16 bits each. Bus 210 is used to load pointer words and a data file from either data memory 105 or vector arithmetic computation results from arithmetic unit 104 (FIG. 1). Data read from the vector data file 206 are composed of four concatenated vector elements R1, R2, R3, R4 which are put on a read data bus 207 for use by vector arithmetic units 104 or for storage in the data memory 105 (FIG. 1). Thirty-six bits of the 64 bits read from the vector data file 206 are also coupled to a first input of 36 multiplexors 205 (shown illustratively as four groups e.g., of 9 multiplexers) for use in address updating as will be described below.

The address used to select each one of the four vector elements (R1-R4) composing each read or write operation of the vector data file 206 comes from one of the fields of a vector pointer word read from the vector pointer array 202 via read bus 203. Each field is logically ANDed with the appropriate enable 208 generated by the instruction unit 102 (FIG. 1) to form the address used to access the vector data file 206. The enabled addresses are simultaneously coupled to the input of an increment-by-4 array 204. The incremented addresses are connected to a second input of multiplexors 205. The selection between the first and second input of multiplexors 205 is made by a multiplexor control signal 211. The output of multiplexors 205 is connected to the input of the address pointer array 202 so that the output can be written into the array 202. Pointer data words read from the pointer array 202 may be sent to data memory 105 (FIG. 1) via bus 209. One skilled in the art of array logical design can see that this arrangement of incrementing the address pointer value after use to address the data array (post incrementing) can be modified to increment prior to use by coupling incrementer array 204 directly to the output of read bus 203 and connecting their outputs to the address enable stages 230 (pre-incrementing).

The element space (e.g., 512 words) of the vector data file 206 is subdivided and allocated, preferably by software, to the data vectors needed by a particular algorithm being implemented. The values put into a vector pointer file stored in pointer array 202 define a starting address of each of up to 8 vectors. The values are loaded into the pointer array 202 preferably using a program instruction, for example, VPTRLOAD. With reference to FIG. 2, the execution of the instruction VPTRLOAD places values to be loaded onto bus 210 and the address of the pointer word to be loaded onto the "pointer select" input to the word address decoder 201. The value placed onto bus 210 may come from data memory 105, or be the result output of an arithmetic or logical computational unit 104 (FIG. 1).

Figure 3:
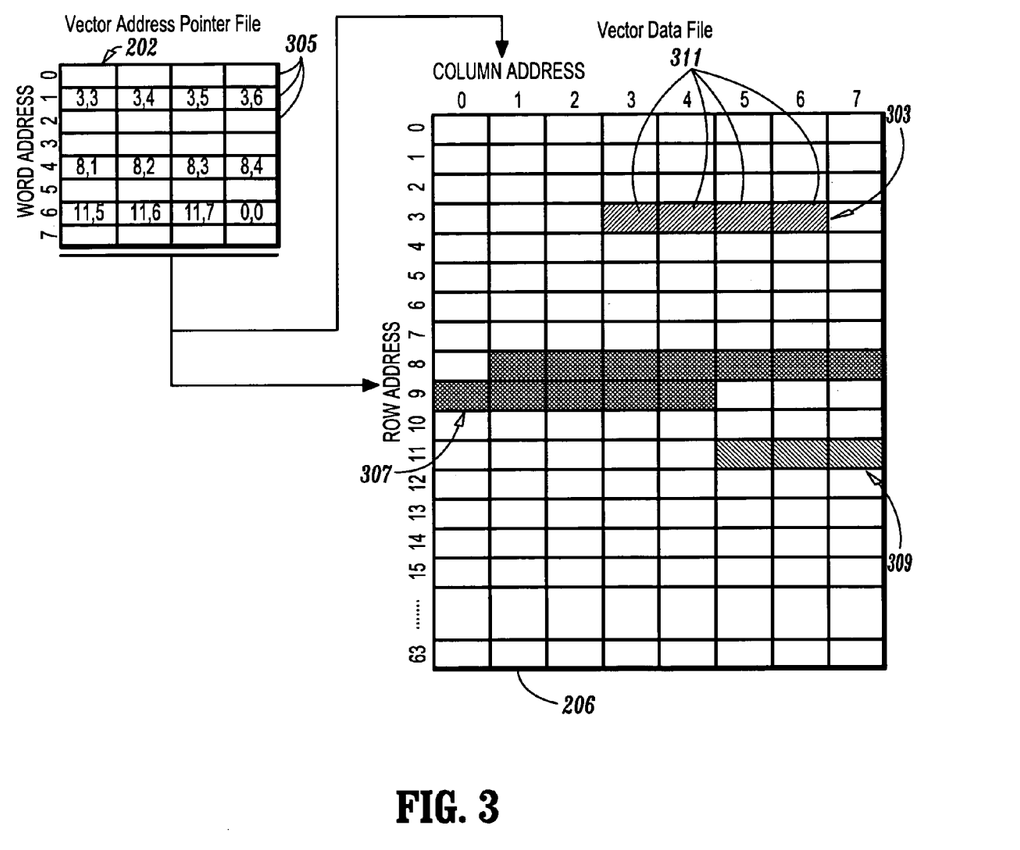
FIG. 3 shows an illustrative example of a data register partition including three vectors in accordance with the present invention.

Referring to FIG. 3, an example partitioning of one embodiment of the vector data file 206 is shown holding 3 small vectors. A 9 bit address of each element is composed of a row address of 6 bits (64 rows) and column address of 3 bits (8 columns). A first vector 303 in the example is composed of 4 elements 311 with the first element in row 3, column 3. The second element is in row 3, column 4 and so on. To address vector 303, the vector pointer array 202 is set, preferably by a software program. The program has set up word address "1" of the pointer array to point to the 4 elements of vector 303. In the vector address pointer file 202, 36 bits of word address "1" are divided into 4 fields 305 of 9 bits which have been initialized as shown in FIG. 3. The values in each field 305 of the pointer are illustratively shown as row, column values although a 9 bit binary number (or other sized word) would actually be stored. For example, the element address of the element at 3,3 is actually stored as binary 000011011. A second vector 307 has 12 elements starting at 8,1. Pointer word address "4" is used to address the starting 4 elements of this vector with the values shown. A third vector 309 is composed of 3 elements with the first at location 11,5 and the others as shown. Since there is no fourth element, the fourth pointer field is set to 0,0 although it is a don't care.

For the embodiment shown illustratively in FIG. 2, the basic operations on the vector data file 206 include, for example, sequential read, sequential write, indirect read and indirect write. The indirect mode of access is one important feature of the present invention and permits the addressing of arbitrary collections of elements in the vector data file 206 to form subvectors. These subvectors may be used, for example, to do table lookups of vector values or to gather elements into subvectors for SIMD processing. Other uses of the present invention may include, for example, strip-mining of vectors. Strip-mining of vectors include assembling sub-vectors via indirect read and writing (storing) the resulting subvectors back into data memory 105 for later use in subsequent program steps, for e.g., filtering.

During a given logical cycle of operations on the vector register file 103 (FIG. 1), the following operations may be performed: an operation on the pointer array 202 is specified (read or write operation), an index (which is an address, e.g., a word address between 0 and 7) into the pointer array is provided, the 4 entries of the pointer array 202 corresponding to the supplied index are read from the pointer array 202, the 4 entries read from the pointer array are used to generate a set of addresses (4 shown) into the vector data file 206 (preferably, this is triggered by a set of 4 address enable signals 208 as shown), the elements of the vector data file 206 corresponding to the supplied set of addresses are read from the vector data file 206, and control signals are provided to selectively control the update of the entry in the pointer array corresponding to the supplied index. These control signals include at least a "putaway control" signal with a value of "yes" or "no" specifying, if equal to "yes," that the output value of multiplexers 205 on bus 250 are to be written back into pointer address array 202 via write port 251. The control signals also include a multiplexer control signal 211 to determine if the incremented address read from pointer file 202 corresponding to the supplied set of address enable signals 208 or the data read from the vector data register file 206 are to be coupled to the bus 250.

Referring again to FIG. 2, other operations (such as an increment operation, a stride operation or an increment-modulo addressing operation) may be performed on the set of addresses supplied by the vector address pointer file 202, and a multiplexor circuit 205 may be employed to selectively output the data resultants from such operations or the data read from the elements of the vector data file 206. In this case, the update of the entry in the pointer array (202) corresponding to the supplied index may use the data selectively output by the multiplexor circuit 205.

These operations are triggered by instructions which include operations on vector data in vector register file 103. Specifications for the source of the data on bus 210 and the destination of data on buses 209 and 207 are also derived from the instruction stream.

Sequential vector read begins with a starting address in one of the 8 address words (0-7) in the pointer array 202. For illustrative purposes, the vector file 206 partitioning shown in FIG. 3 will be used and the read of the second vector 307 will be described to illustratively explain further features and details of the present invention.

With reference to FIGS. 1, 2 and 3, the first cycle of operation specifies a read of word address "4" of the pointer array 202, an enable of all 4 addresses, a read of the vector data file 206, a multiplexor control 211 value of 1 (e.g., select left leg of multiplexor), and a "yes" putaway value. The putaway value is a bit from an instruction specifying whether the output of multiplexers 205 are to be written back into pointer address array 202. The putaway value is implemented as a control signal which determines if the value on bus 250 is to be written into pointer array 202 via write port 251. This will result in the first 9 bits of the vector pointer word address "4" being the address of a first subvector element read from the vector data file 206. The element at 8,1 in the vector data file 206 is read and placed on R1 of bus 207. Similarly, the second field in pointer word "4" specifies that the element at 8,2 in the data file be read and placed on R2 of bus 207, similarly for the third and fourth elements. The four 16 bit data values read (R1-R4) are assembled into a subvector and passed via read data bus 207 to either the data memory 105 or the vector arithmetic unit 104. Simultaneously, the values read from pointer word "4" are incremented to the next sequential values (by adding 4, since 4 elements are processed at a time) by incrementers 204.

Since the multiplexor control 211 selects the incremented value and the putaway control specifies that the updated values are to be put back into the pointer array 202, the values (8,5), (8,6), (8,7) and (8,8) are stored back into the pointer file word address 4 via multiplexors 205. One skilled in the art understands that the addition of 4 (binary 000000100) to the value representing row 8 column 1 (binary 001000001) will result in binary 001000101 which is the representation of row 8 column 5 (8,5) and similarly for the other 3 values.

The control values for the next cycle of operation are identical to the first cycle but because the updated pointer values are used to access the vector data file 206, the next four elements of the vector are assembled and put onto bus 207. This identical control value is repeated for additional cycles (a total of 3 for this example) to sequentially read the entire element vector (12 elements in this case) and place the vector on bus 207.

Sequential writing or loading of a vector is very similar to reading. Using the second vector of FIG. 3 as an example again, the first cycle of operation which accesses data in the vector data file 206 specifies a read of word address 4 of the pointer array 202, an enable 208 of all 4 addresses, a write of the vector data file 206, a multiplexor control 211 value of 1 (e.g., select left leg), and a "yes" putaway control value. This value will result in the first 9 bits of the vector pointer word address "4" being the address of the first subvector element written into the data file 206. The first 16 bits of bus 210 are written into the element at 8,1 in the vector data file 206. Similarly, the second field in pointer word address "4" specifies that the element of 8,2 in the data file 206 is to be written with the second 16 bits from bus 210. Similarly for the third and fourth elements. The four 16 bit data values taken from the 64 bits on bus 210 are now written into the vector data file 206. Simultaneously, the value read from pointer word address "4" values are have been incremented to the next sequential values (by adding 4, since 4 elements are processed at a time) by incrementer 204. Since the multiplexor control 211 selects the incremented value and the putaway control value specifies that the updated values are to be put back into the pointer array 202, the values (8,5)(8,6)(8,7) and (8,8) and are stored back into the pointer file word address "4" via multiplexors 205. The identical control word is repeated twice more and the next two values on bus 210 are stored into the data file to make up a 12 element vector.

The indirectly addressed modes of operation (indirect read and indirect write) may illustratively be used for the following:

1) arbitrary subvector access via a list of addresses stored as a vector in the vector data 206 file;

2) data directed access if the signal samples are placed into the pointer register 202, in this case, each signal value may access a vector element as is needed in many algorithms to select filter coefficients; and 3) data gather operations to convert scattered data into sequential SIMD processable data.

This is not an exhaustive list as the indirect commands may be employed for other tasks as well.

Figure 4:
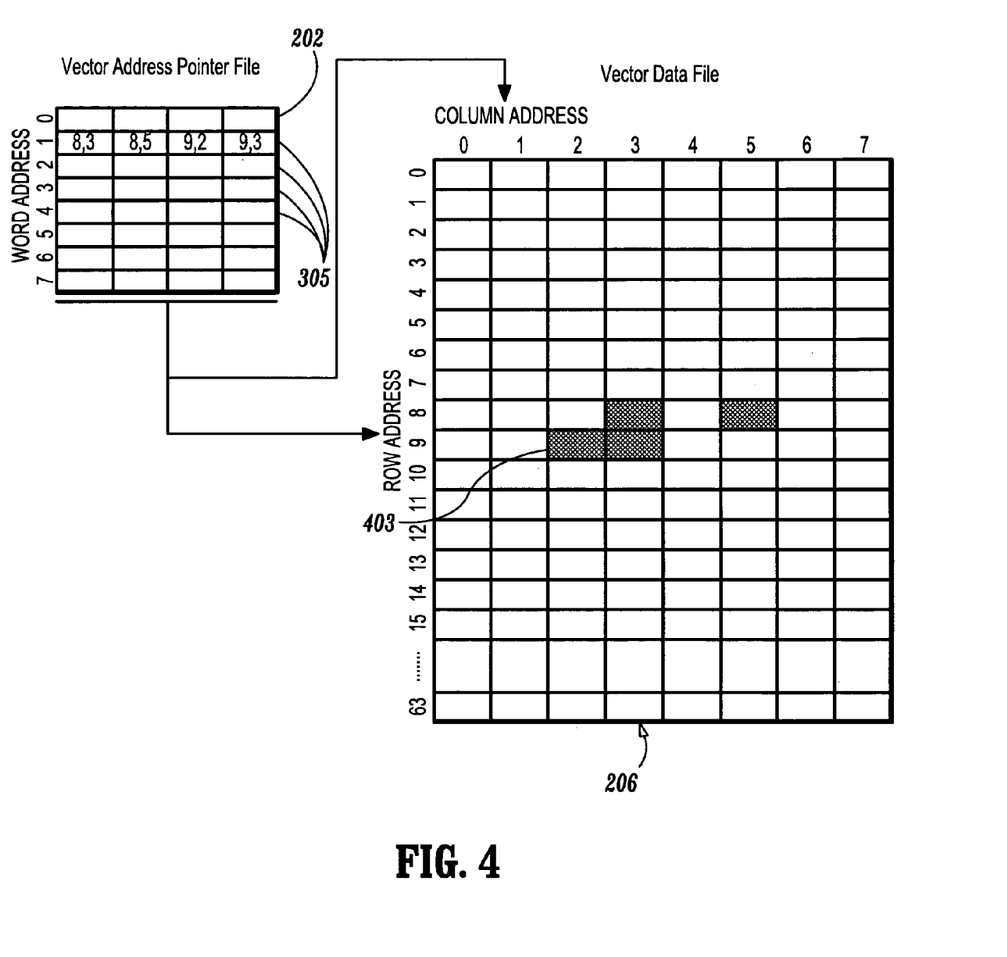
FIG. 4 shows another illustrative example of a data register partition for a vector in accordance with the present invention.

Indirect read will be described using the example partitioning shown in FIG. 4 with continued reference to FIG. 2. The four element first vector 403 includes the binary element values equivalent to the addresses (8,3),(8,5),(9,2), and (9,3) in a vector data file 206. The control for the first cycle ofoperation which accesses data in the vector register data file 206 specifies a read of word address "1" of pointer array 202, an enable 208 of all 4 addresses, a read of the vector data file 206, a multiplexor control value 211 of 0 (select right leg), and a "yes" putaway control value. This value will result in the 16 bit element in the vector data file 206 at location 8,3 being read from the vector data file 206 and placed on R1 of bus 207. Nine bits of this value are also coupled to the first of multiplexors 205. As stated above, these 9 bits have the binary value equivalent to the address of an element in the vector data file 206. Similarly, 9 bits of each of the values at the other 3 elements are coupled to multiplexor 205. Since the multiplexor selection control 211 specifies select right and the putaway control specifies "yes", the values contained in locations (8,3), (8,5), (9,2), and (9,3) are written into the four fields of pointer word address "1".

The second cycle of control specifies a read of word address "1" of the pointer array 202, an enable of all 4 addresses 208, a read of the vector data file 206, a multiplexor control value 211 of 0 (select right leg), and a "no" putaway control value. The second cycle of operation results in a read of the four elements whose addresses are now in pointer file word address "1" being read from the vector data file 206 and placed on bus 207. These are the four elements whose location in the vector data file 206 corresponds to the values in the low order 9 bits of locations (8,3), (8,5), (9,2), and (9,3) in the vector data file 206.

An indirect write ("data scatter") operation is controlled with a similar sequence. Note that the ability to perform a data scatter operation needs a 64 bit write port 261 (FIG. 2) to be sectioned into four 16 bit ports (64 bits total) such that each element address 230 can specify a write to any 16 bit data element in the vector data file 206. With this capability, element 1 address specifies where vector element R1 in the first 16 bits of the 64 bit bus 210 is written in data file 206, element 2 address specifies where vector element R2 in the second 16 bits of 64 bit bus 210 is written in data file 206, and so on for R3 and R4. A simplified embodiment may omit this capability for hardware cost reasons. In the described embodiment, the control for the first cycle of operation which accesses data in the vector register data file 206 specifies a read of word address "1" of the pointer array 202, an enable 208 of all 4 addresses, a read of the vector data file 206, a multiplexor control value 211 of 0 (select right leg), and a "yes" putaway control value. This reads the values in the 4 elements specified and writes the values back into the pointer array word address "1". The second cycle control specifies a read of word address "1" of the pointer array 202, an enable 208 of all 4 addresses, a write of the vector data file 206, a multiplexor control 211 value of 0 (select right leg), and a "no" putaway control value. This takes the four elements on bus 210 and places them in the four elements of the vector data file 206 specified by the addresses read in the first cycle.

The ability to specify the starting point of the computation in the data file using an arbitrary pointer makes it extremely easy and fast to "slide" one vector over another or itself for computations such as filtering and convolution.

One skilled in the art would understand that the logic for address generation and use shown in FIG. 2 can be duplicated for multi-port access of the vector data file 206. The first extension of the embodiment of FIG. 2 for multi-port operation is to make the Read and Write ports (262 and 261, respectively) of file 206 capable of simultaneous operation, i.e. a two port file with one port dedicated to read and the other dedicated to write. With such a structure, new data may be loaded into the vector data file 206 from bus 210 via write port 261 as old data is read by read port 262 and put on bus 207, processed and the results written back to data memory 105. This permits a vector of arbitrary size to be streamed through the processing units.

Figure 5:
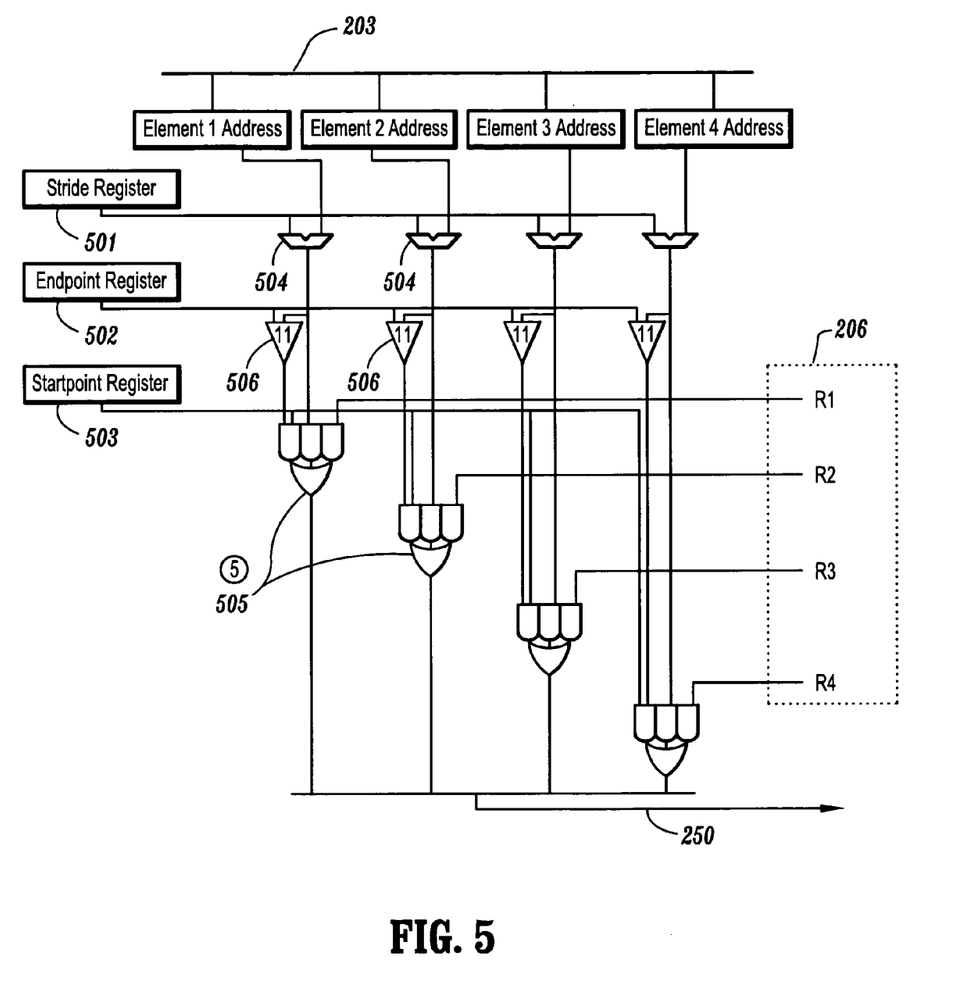
FIG. 5 is a schematic diagram of an alternative embodiment of the address incrementer showing new address multiplexors and stride and modulo addressing capability in accordance with the present invention.

Referring to FIG. 5, modifications to the embodiment of FIG. 2 are shown to provide for the other addressing modes, e.g., stride and modulo addressing. Other addressing modes may also be implemented using appropriate logic or software. The address incrementers 204 and multiplexors 205, in FIG. 2 may be replaced with the hardware shown in FIG. 5. Incrementers 504 and multiplexers 505 are included. The inputs include the element addresses 508 read from the pointer file (202), the vector data from the register file 206, the output is the updated address bus 250 which is stored in the pointer file 202. For stride accesses, a stride value is stored, preferably by a program, in stride register 501 and the accesses proceed as described for sequential access above. However, the stride value is added (or subtracted) to the pointer file value instead of the fixed value 4. Modulo (circular) addressing is performed by, for example, the program loading a starting address of the circular buffer in the Startpoint register 503 and in the pointer file 202 (FIG. 2). The end of the vector is loaded in an endpoint register 502. Operation proceeds using the stride register 501 value to increment the address as above. Each cycle, the compare equal circuits 506 compare the updated address with the endpoint address to see if the end of the vector has been reached. If it has, the multiplexor 505 is conditioned to provide the startpoint address from the startpoint address register 503 as the new address to the pointer file 202 instead of the updated address.

The present invention provides many advantages over the prior art. For example, due to the flexible addressing provided by the present invention, addressing of data memory 105 is simplified. Other advantages may include the following. Addressing of data for complex loops and table lookup can be easily specified in a few instructions, the present invention makes the size of programs smaller and therefore increases the efficiency of instruction memory 101. The present invention enables the capability for each element in the vector address file 206 to be able to include any address of any element in the data array 202 independent of the contents of any other element in the vector address file 206. For example, two elements can have the same address while any requirements that the addresses refer to sequential data elements in the data file are eliminated. Other advantages and benefits may be realized by the present invention.

According to other embodiments of the present invention, a digital signal processor (DSP) includes dual SIMD units that are connected in cascade, and wherein results of a first SIMD stage of the cascade may be stored in a register file of a second SIMD stage in the cascade. Each SIMD stage contains its own resources for storing operands and intermediate results (e.g., its own register file), as well as for decoding the operations that may be executed in that stage. Within each stage, hardware resources are organized to operate in SIMD manner, so that independent SIMD operations can be executed simultaneously, one in each stage of the cascade. Intermediate operands and results flowing through the cascade are stored at the register files of the stages, and may be accessed from those register files. Data may also be brought from memory directly into the register files of the stages in the cascade.

It is to be appreciated that the present invention offers significant advantages over conventional approaches. For instance, because SIMD functional units are connected in cascade and can be used simultaneously in the computation of signal processing kernels, there is no need to perform a sequence of discrete operations using the same arithmetic/logic unit. Furthermore, the present invention also improves upon the pipeline approach described above because each stage in the cascade operates independently of the previous stage (e.g., each stage executes its own instructions), and data can be transferred to/from memory into the register files of either one of the stages.

Additionally, various embodiments of the present invention improve upon the conventional VLIW approach by using a single instruction to specify all the operations and at the same time allow specification of independent registers for the operands. Furthermore, various embodiments of the present invention improve upon the SIMD with subword parallelism approach by enabling the use of a flexible mechanism to select data elements used by a SIMD instruction, without requiring concatenation of the data elements in a single register.

Figure 6:
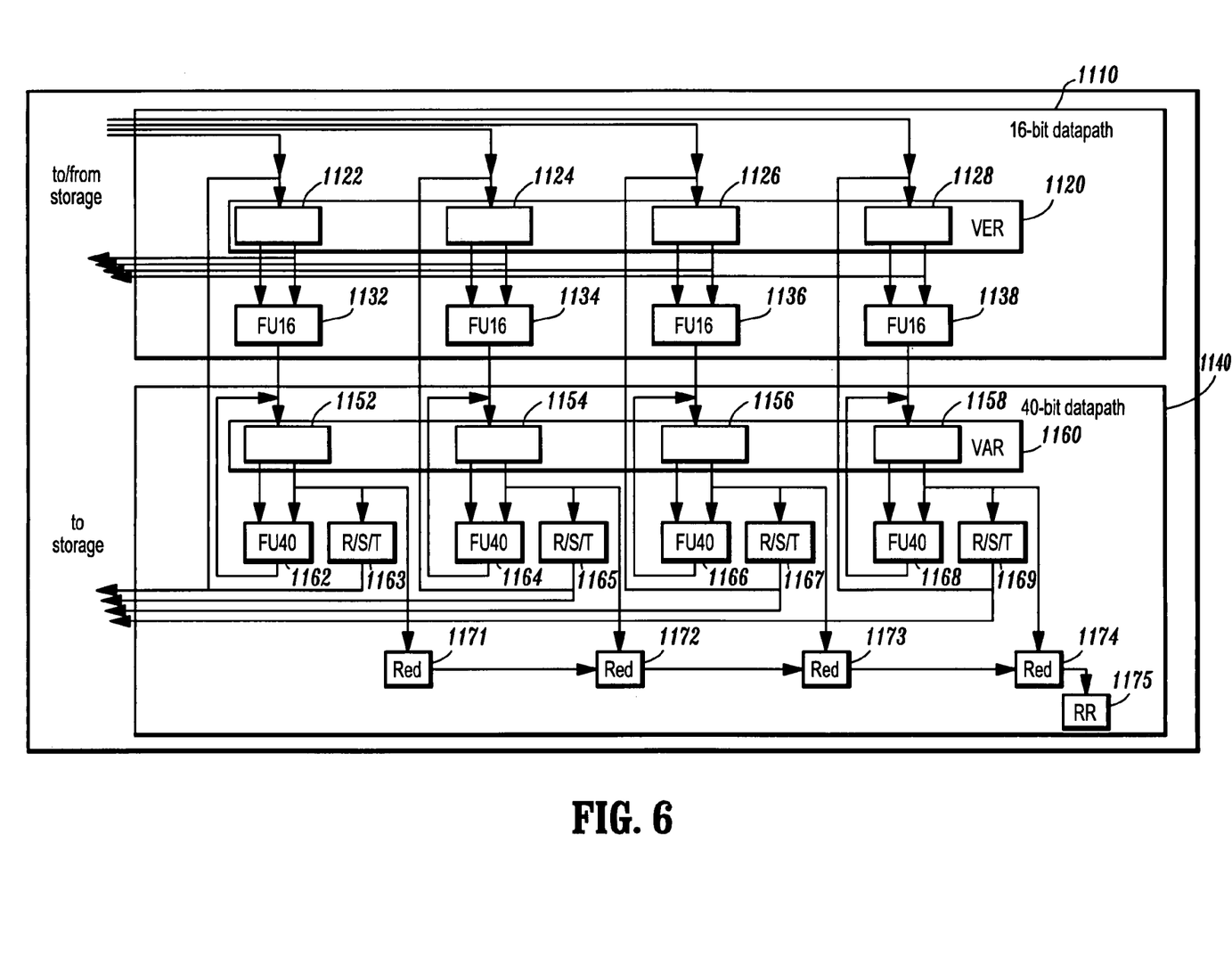
FIG. 6 is a diagram of an exemplary digital signal processor with cascaded SIMD organization.

Referring to FIG. 6, an exemplary digital signal processor 1100 includes a 16-bit datapath 1110 that performs four operations in SIMD fashion on 16-bit data values 1122-1128 obtained from a register file, herein called a Vector Element Register File (VER) 1120, generating four intermediate results. The VER 1120 is capable of delivering 8 operands and receiving 4 values every cycle. The four results generated in the 16-bit datapath 1110 are placed in another register file wherein each element 1152-1158 is 40-bits wide, herein called a Vector Accumulator Register File (VAR) 1160. Each functional unit (FU16) 1132-1138 within the the 16-bit datapath 1110 includes, for example, a 16-bit by 16-bit multiplier and a 16-bit ALU that performs arithmetic, logic, shift, and select operations on the contents of the 16-bit data. Four 16-bit data elements can be transferred from memory into the VER 1120, as well as four 16-bit data elements can be transferred from the VER 120 to memory.

Meanwhile, a 40-bit datapath 1140 simultaneously performs four operations on 40-bit values 1152-1158 obtained from the VAR 1160, also in SIMD fashion, generating four results that are placed back into the VAR 1160. The VAR 1160 is also capable of delivering 8 operands and receiving 4 values every cycle. Each functional unit (FU40) 1152-1158 within the 40-bit datapath 1140 includes, for example, of a 40-bit ALU that performs arithmetic, logic, shift, and select operations on the contents of the 40-bit data. Moreover, additional dedicated hardware (Red 1171-1174) may be used to combine four values into a single result (an operation known as "reduction"), placing the result in a dedicated special register RR 1175. Four 40-bit data elements can be transferred into memory from the VAR 1160 in parallel.

Further functionality with this organization optionally includes the ability to transfer data values from the 40-bit VAR 1160 to the 16-bit VER 1120 after executing an operation that reduces the size of the data values (e.g., rounding, truncation, saturation, bit extraction, or combinations thereof), which is performed in the blocks labeled R/S/T 1163-1169.

Consequently, two independent 4-element SIMD instructions can be executed simultaneously at any cycle with this hardware organization, one in each of the two SIMD computational datapaths.

It should be appreciated that an appropriate width extension may be performed on the results from the first datapath before such results are placed in the register file of the second datapath, and an appropriate size reduction may be performed on the results from the second datapath when they are moved to the register file of the first datapath or to memory.

Furthermore, although FIG. 6 shows the width of the datapaths as 16-bit and 40-bit, respectively, it should be appreciated that the width of these datapaths may be implemented as a different pair of values. For example, a 24-bit datapath may be coupled to a 50-bit datapath. It should be appreciated that the width of the datapaths may vary as a design choice without departing from the spirit and scope of the present invention.

A typical use of the organization shown in FIG. 6 is for computing 16-bit multiply operations in the 16-bit datapath 1110, thereby generating 32-bit results, followed by 40-bit accumulate operations in the 40-bit datapath 1140. For this computation, 16-bit data values are transferred from memory into the VER 1120, multiplication operations are performed in the 16-bit datapath and the 32-bit results are placed into the VAR 1160, after an expansion to 40-bits (e.g., sign-extension or zero-extension). 40-bit data from the VAR 1160 are added (accumulated), and the results are placed into the VAR 1160 for further use later. Upon completion of a series of accumulation operations, final results are transferred from the VAR 1160 to memory, either as 40-bit values, or as 32-bit values through an operation that reduces the size of the data values (e.g., rounding, truncation, saturation, bit extraction, or combinations thereof).

In order to provide the eight data values required by the SIMD operations, and to save the four values generated by the SIMD operations, the register files may be organized in any of the several ways that are currently practiced in the art for these purposes. For example, the register files may consist of four smaller register "banks" (such as the register banks 1122-1128 shown in FIG. 6) wherein each register bank has two read ports and one write port. Each one of these register banks provides the data for only one of the functional units in the SIMD datapath. This approach requires that each set of four values used in one SIMD operation be properly distributed across the four register banks, prior to the use of those values, in the order in which the values will be used by the SIMD operation. Similarly, the four values to be placed at once in a register file must be distributed across the register banks.

Figure 7:
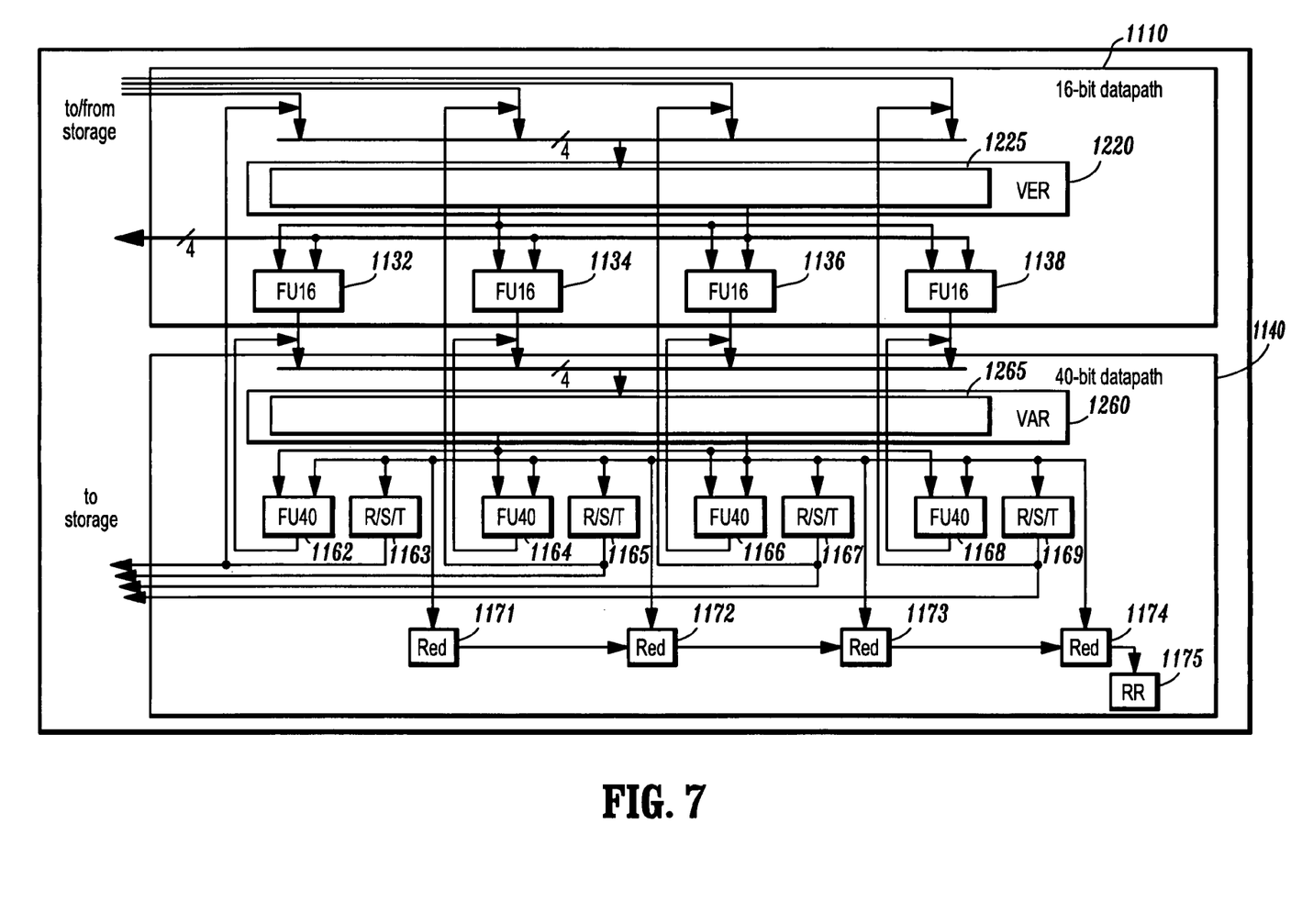
FIG. 7 is a diagram of an exemplary digital signal processor with cascaded SIMD organization using wide registers.

Another alternative for the register files includes the use of "wide" registers that contain a plurality of data values (elements) each. As depicted in FIG. 7., a VER 1220 and a VAR 1260 include wide registers 1225 and 1265, respectively. In this embodiment, only two registers (two read ports) are accessed for retrieving the eight values used for performing a SIMD operation. Similarly, only one register (one write port) is accessed to place the four results generated by a SIMD operation. This corresponds to the approach known as "subword parallelism". As a result, the VER 1220 and the VAR 1260 each have just two read ports and one write port. This approach requires that each of the sets of four values used in one SIMD operation be placed together in one single register prior to the use of those values, in the order in which the values will be used by the SIMD operation. Similarly, a single register is accessed to place in the register file at once the four values generated by a SIMD operation.

Figure 8:
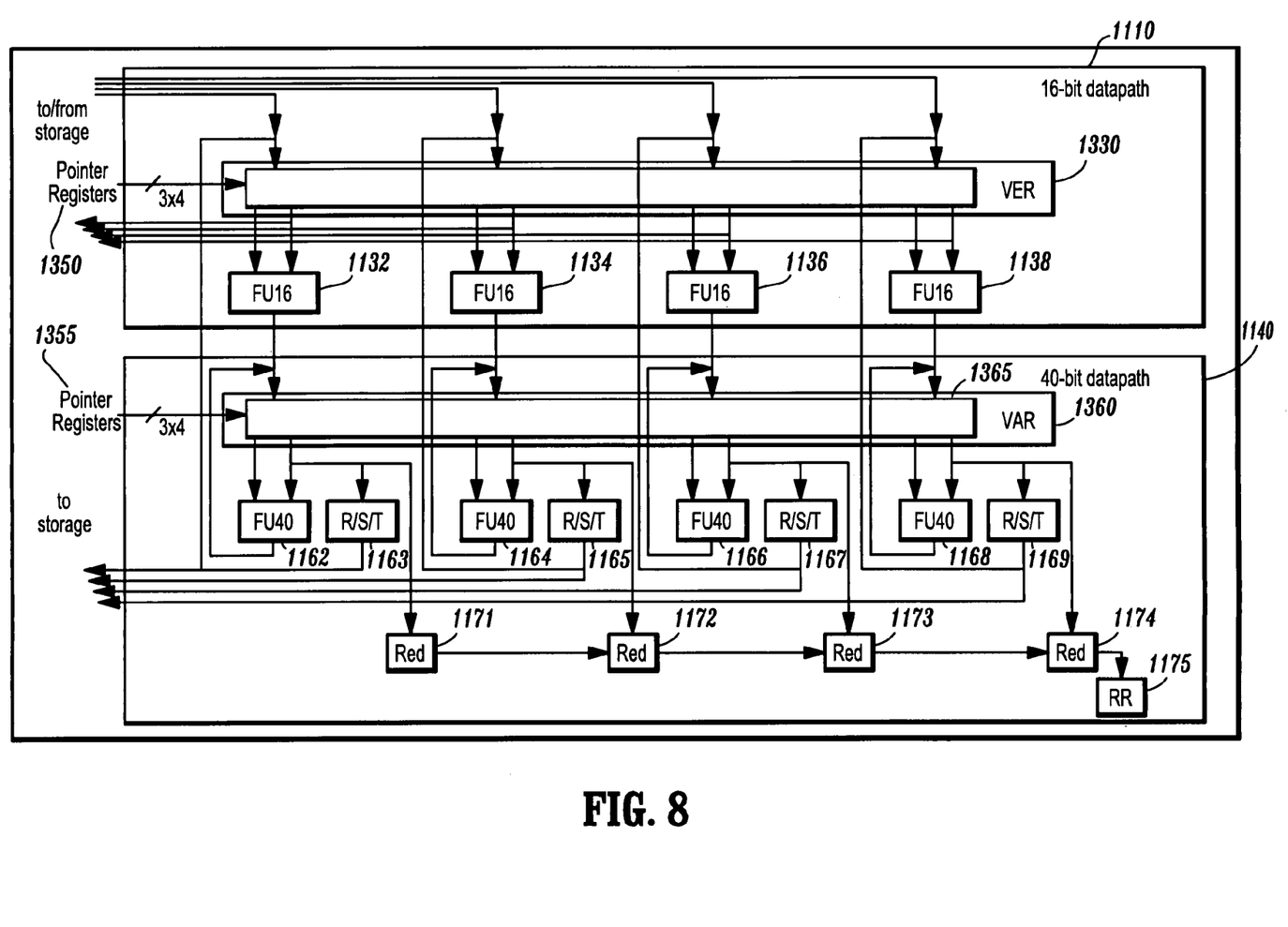
FIG. 8 is a diagram of an exemplary digital signal processor with cascaded SIMD organization using arbitrary vector addressing.

FIG. 8 illustrates a more flexible alternative for the register files that includes the use of a 8-read 4-write register file of the type described above, including the pointer registers. In such a case, the sets of values used in a SIMD instruction are selected arbitrarily among any of the registers in the file, in any order, as specified by the contents of the pointer registers. The flexibility provided by such an arrangement enables more powerful data manipulation mechanisms, at the cost of a more complex register file (more ports). As further described above accesses to register files are performed indirectly through a pointer register. That is, each pointer register (1350 and 1355) contains indexes into a register file (1330 and 1360, respectively), thereby enabling selection of arbitrary registers in the register file. Two register pointers may be used to read data from a register file, and a third pointer register may be used to specify where to place data in the register file. Furthermore, the pointer registers (1350 and 1355) may be automatically incremented according to the operation performed in the SIMD datapath, so that successive SIMD operations can access structured arrays of data from the register file without requiring explicit data manipulation operations.

As will be evident to one skilled in the art, any combination of known or later developed register file structures may be used to implement the present invention. For example, FIG. 9 shows the cascade of two SIMD stages in which a 16-bit datapath 1410 includes a 12-port register file (VER 1330) for flexible access to the 16-bit data, using the pointer register arrangement described above whereas the register file in the 40-bit datapath (VAR 1440) has registers that contain four elements each so that only two read and one write port are required (subword parallelism).

Figure 9:
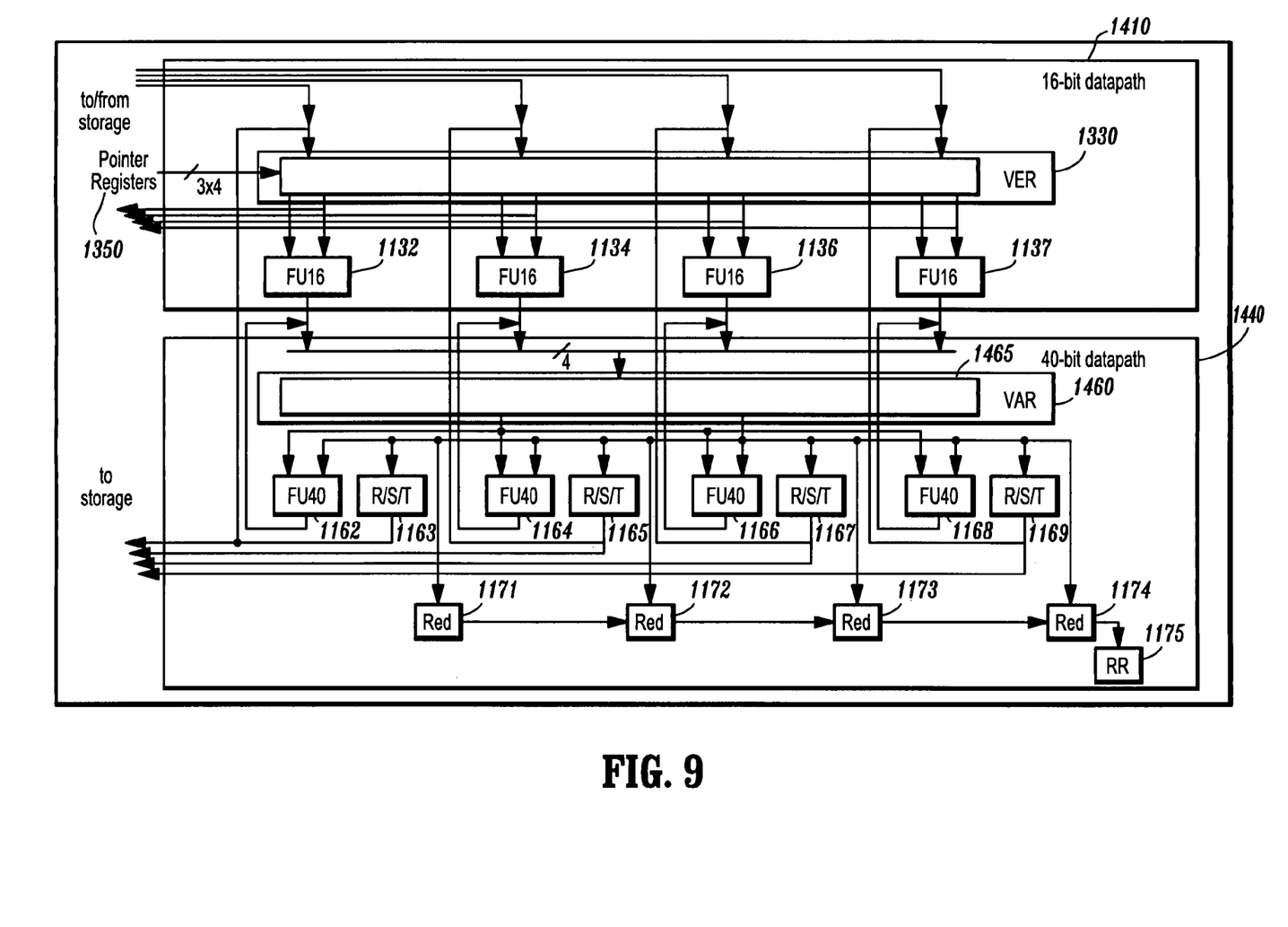
FIG. 9 is a diagram of an exemplary digital signal processor with cascaded SIMD organization using arbitrary vector addressing in only a first datapath.

The two-stage cascade organization shown in FIG. 9, offers much more flexibility and computing capability for the execution of digital signal processing algorithms than the existing state-of-the art. The combination of two SIMD stages in cascade allows the simultaneous execution of up to 8 digital signal processing arithmetic/logic operations which are specified through two independent SIMD instructions, one for each datapath.

The above examples illustrate some of the major advantages of the present invention though they are not meant to be limiting. Furthermore, some of the features described and illustrated were chosen for simplicity of exposition rather than optimality of design. For example, the exact number of functional units at a particular stage may be more or less than the number of functional units depicted in the figures. Furthermore, the actual operations that are performed in the datapaths (16-bit or 40-bit) are determined by the specific signal processing application wherein the invention is utilized, and thus it should be appreciated that the functional units may include any logical and arithmetic operation needed by the applications that would run on the particular processor.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for processing digital signal information using a processor having a first datapath connected in cascade to a second datapath, comprising the steps of:
   executing a first SIMD instruction in the first datapath;
   executing a second SIMD instruction in the second datapath concurrently with the first SIMD instruction; and
   transferring the results of an operation performed in the first datapath to the register file of the second datapath, wherein the results transferred to the register file of the second datapath are operated upon in the second datapath, wherein the results transferred to the register file of the second datapath are zero-extended or sign-extended to have a bit-length equal to the width of the second datapath.

2. The method of claim 1, wherein the first datapath and the second datapath each includes its own register file.

3. The method of claim 2, wherein executing the first SIMD instruction includes loading vector information into the register file of the first datapath.

4. The method of claim 2, further comprising the step of transferring results of an operation performed in the second datapath to memory.

5. The method of claim 2, further comprising the step of transferring results of an operation performed in the second datapath to the register file of the first datapath.

6. The method of claim 2, wherein data transferred to memory or to the register file of the first datapath is size reduced.

7. The method of claim 6, wherein the size reduction includes at least one of saturation, rounding, truncation, and bit extraction.

8. The method of claim 2, wherein at least one of the register files is organized as a plurality of register banks.

9. The method of claim 2, wherein at least one of the register files is organized as a wide register.

10. The method of claim 2, wherein at least one of the register files is organized as a register file with arbitrary addressing of its elements.

11. The method of claim 10, wherein the arbitrary addressing is accomplished using a pointer register having a plurality of pointers, each of the pointers pointing to an element of the register file.

12. The method of claim 11, wherein operands of a SIMD instruction are specified using the pointer register.

13. The method of claim 11, wherein result data to be stored is specified using the pointer register.

14. The method of claim 2, further comprising the steps of:
   combining a plurality of values into a single result using dedicated hardware; and
   placing the single result into a dedicated register.

15. The method of claim 1, wherein the width of the first datapath differs from the width of the second datapath.

16. The method of claim 15, wherein the width of the first datapath is less than the width of the second datapath.

17. The method of claim 16, wherein the width of the first datapath is 16 bits and the width of the second datapath is 40 bits.

18. The method of claim 2, further comprising the step of transferring results of an operation performed in the second datapath to the register file of the second datapath.

19. A digital signal processor, comprising:
   a first datapath for executing a first SIMD instruction; and
   a second datapath coupled in cascade to the first datapath for executing a second SIMD instruction concurrently with the first SIMD instruction,
   wherein the width of the first datapath differs from the width of the second datapath.

20. The digital signal processor of claim 19, wherein the first datapath and the second datapath each includes its own register file.

21. The digital signal processor of claim 20, wherein vector information is stored in the register file of the first datapath.

22. The digital signal processor of claim 20, wherein results of an operation performed in the first datapath are transferred to the register file of the second datapath.

23. The digital signal processor of claim 22, wherein the results transferred to the register file of the second datapath are operated upon in the second datapath.

24. The digital signal processor of claim 22, wherein the results transferred to the register file of the second datapath are zero-extended or sign-extended to have a bit-length equal to the width of the second datapath.

25. The digital signal processor of claim 20, wherein results of an operation performed in the second datapath are placed in the register file of the second datapath.

26. The digital signal processor of claim 20, wherein results of an operation performed in the second datapath are transferred to memory.

27. The digital signal processor of claim 20, wherein results of an operation performed in the second datapath are transferred to the register file of the first datapath.

28. The digital signal processor of claim 20, wherein a size reduction unit is connected to the register file of the second datapath for reducing bit length of data transferred to memory or to the register file of the first datapath.

29. The digital signal processor of claim 28, wherein the size reduction unit is configured to perform at least one of saturation, rounding, truncation, and bit extraction.

30. The digital signal processor of claim 20, wherein at least one of the register files is organized as a plurality of register banks.

31. The digital signal processor of claim 20, wherein at least one of the register files is organized as a wide register.

32. The digital signal processor of claim 20, wherein at least one of the register files is organized as a register file with arbitrary addressing of its elements.

33. The digital signal processor of claim 32, wherein the arbitrary addressing is accomplished by a using a pointer register having a plurality of pointers, each of the pointers pointing to an element of the register file.

34. The digital signal processor of claim 33, wherein operands of a SIMD instruction are specified using the pointer register.

35. The digital signal processor of claim 33, wherein result data to be stored is specified using the pointer register.

36. The digital signal processor of claim 20, wherein dedicated hardware is used to combine a plurality of values into a single result placed into a dedicated register.

37. The digital signal processor of claim 19, wherein the width of the first datapath is less than the width of the second datapath.

38. The digital signal processor of claim 37, wherein the width of the first datapath is 16 bits and the width of the second datapath is 40 bits.

39. A program storage device readable by a machine, tangibly embodying a program of instructions executable on the machine to perform method steps for processing digital signal information using a processor having a first datapath connected in cascade to a second datapath, the method steps comprising:

executing a first SIMD instruction in the first datapath;

executing a second SIMD instruction in the second datapath concurrently with the first SIMD instruction; and transferring the results of an operation performed in the first datapath to the register file of the second datapath, wherein the results transferred to the register file of the second datapath are operated upon in the second datapath, wherein the results transferred to the register file of the second datapath are zero-extended or sign-extended to have a bit-length equal to the width of the second datapath.

\* \* \* \* \*